(12) United States Patent
Ryu

(10) Patent No.: US 9,394,941 B2
(45) Date of Patent: Jul. 19, 2016

(54) OIL-FREE TURBOCHARGER BEARING ASSEMBLY HAVING CONICAL SHAFT SUPPORTED ON COMPLIANT GAS BEARINGS

(71) Applicant: BorgWarner Inc., Auburn Hills, MI (US)

(72) Inventor: Keun Ryu, Seoul (KR)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/432,814

(22) PCT Filed: Oct. 2, 2013

(86) PCT No.: PCT/US2013/062950
§ 371 (c)(1),
(2) Date: Apr. 1, 2015

(87) PCT Pub. No.: WO2014/062373
PCT Pub. Date: Apr. 24, 2014

(65) Prior Publication Data
US 2015/0275967 A1    Oct. 1, 2015

Related U.S. Application Data

(60) Provisional application No. 61/714,909, filed on Oct. 17, 2012.

(51) Int. Cl.
*F16C 32/06*    (2006.01)
*F16C 33/04*    (2006.01)
*F16C 17/10*    (2006.01)

(52) U.S. Cl.
CPC ............. *F16C 32/0603* (2013.01); *F16C 17/10* (2013.01); *F16C 32/0685* (2013.01); *F16C 33/04* (2013.01); *F16C 2360/24* (2013.01)

(58) Field of Classification Search
CPC ............... F16C 17/024; F16C 32/0969; F16C 32/0614; F16C 32/0696; F16C 33/1065; F16C 33/1095; F16C 33/6607; F16C 33/6696; F05B 2220/704; F05B 2240/50
USPC .......... 384/103–107, 109, 110, 116, 121, 129, 384/134
See application file for complete search history.

(56) References Cited

U.S. PATENT DOCUMENTS

| | | | | |
|---|---|---|---|---|
| 3,434,762 | A | * | 3/1969 | Marley ................. F16C 17/024 384/103 |
| 3,439,962 | A | * | 4/1969 | Gothberg ............ F16C 33/1065 384/107 |
| 3,606,501 | A | * | 9/1971 | Waplington ........ F16C 32/0696 384/110 |
| 4,178,046 | A | * | 12/1979 | Silver ..................... F16C 17/10 384/103 |
| 4,227,752 | A | * | 10/1980 | Wilcock ................. F16C 17/06 384/106 |

(Continued)

FOREIGN PATENT DOCUMENTS

| DE | 102008031730 A1 | * | 1/2010 | ............ F01D 25/162 |
|---|---|---|---|---|
| GB | 2027133 A | * | 2/1980 | ............ D01H 7/565 |

(Continued)

*Primary Examiner* — Marcus Charles
(74) *Attorney, Agent, or Firm* — Young Basile Hanlon & MacFarlane P.C.

(57) ABSTRACT

This invention provides a turbocharger bearing assembly having foil bearing assemblies (21, 22, 23, 24, 30, 35, 36, 37, 40, 41, 42, 45, 46, 47, 50, 52) supporting conical rotor elements (3, 4, 10, 11, 16, 17, 31, 32).

15 Claims, 9 Drawing Sheets

(56) References Cited

U.S. PATENT DOCUMENTS

| | | | | |
|---|---|---|---|---|
| 4,260,205 A * | 4/1981 | Spies | ............ | F16C 17/10 384/109 |
| 4,464,068 A * | 8/1984 | Potrykus | ............ | F16C 17/10 384/103 |
| 4,502,795 A * | 3/1985 | Klaass | ............ | F16C 17/024 384/103 |
| 4,654,939 A * | 4/1987 | Silver | ............ | F16C 33/1095 29/898.02 |
| 5,498,083 A | 3/1996 | Brown | | |
| 5,634,723 A | 6/1997 | Agrawal | | |
| 6,158,893 A | 12/2000 | Heshmat | | |
| 6,439,774 B1 * | 8/2002 | Knepper | ............ | F16C 17/105 29/413 |
| 6,499,969 B1 | 12/2002 | Tombers et al. | | |
| 7,535,150 B1 * | 5/2009 | Wilson | ............ | F04D 29/056 310/166 |
| 8,310,076 B2 * | 11/2012 | Jones | ............ | F01D 15/10 290/52 |
| 8,371,799 B2 * | 2/2013 | Spathias | ............ | F04D 29/056 415/1 |
| 2002/0067872 A1 * | 6/2002 | Weissert | ............ | F16C 17/042 384/106 |
| 2007/0003693 A1 * | 1/2007 | Lee | ............ | C09D 7/1216 427/180 |
| 2008/0057223 A1 * | 3/2008 | Lee | ............ | C23C 4/02 427/576 |
| 2008/0310778 A1 * | 12/2008 | Lee | ............ | F16C 17/024 384/100 |
| 2009/0087299 A1 * | 4/2009 | Agrawal | ............ | F04D 29/584 415/1 |

FOREIGN PATENT DOCUMENTS

| | | | |
|---|---|---|---|
| JP | 01242816 A | * | 9/1989 |
| JP | 2012092969 A | * | 5/2012 |

* cited by examiner

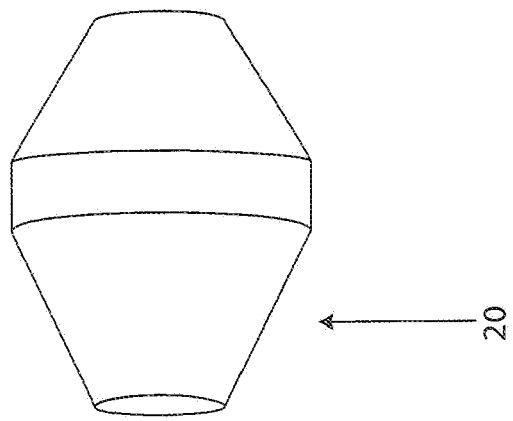
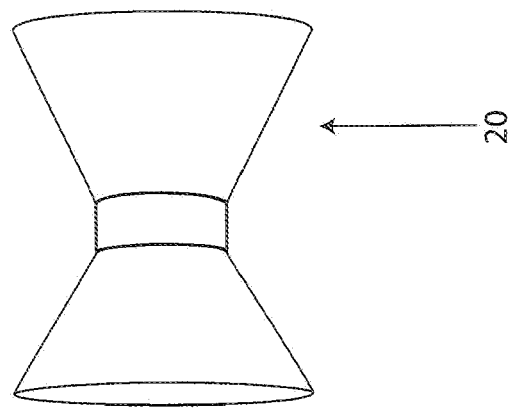

OIL-FREE TURBOCHARGER BEARING ASSEMBLY HAVING CONICAL SHAFT SUPPORTED ON COMPLIANT GAS BEARINGS

CROSS-REFERENCE TO RELATED APPLICATION

This application claims priority to and all the benefits of U.S. Provisional Application No. 61/714,909, filed on Oct. 17, 2012, and entitled "An Oil-Free Turbocharger Bearing Assembly Having Conical Shaft Supported On Compliant Gas Bearings."

BACKGROUND OF THE INVENTION

1. Field of the Invention

This invention relates to a hydrodynamic gas foil bearing assembly having conical rotor elements. The bearing assembly is useful in turbochargers for internal combustion engines. The bearing assembly may also be used in other turbine applications such as small aircraft engines.

2. Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to the engine's cylinders via the engine's intake manifold.

The turbine wheel and the shaft of a turbocharger rotate very fast. The rotation speed of a turbocharger shaft depends upon the size of the compressor and turbine wheels. The maximum wheel speeds for aluminum compressor wheels, titanium compressor wheels, and inconel turbine wheels are 560 m/s, 600 m/s, and 530 m/s, respectively. Therefore, smaller wheels render higher maximum turbocharger rotating speed. The turbine wheel operates in a high temperature environment and may reach temperatures as high as 1922° F. (1050° C.). This heat is conducted to the turbocharger shaft and the bearing housing. The rapid rotation of the turbine shaft creates frictional forces which further heat the bearing area. Accordingly, turbochargers have a need for a low friction bearing assembly, and a flow of fluid for cooling.

In practice, foil bearing supported turbomachinery fails, at extreme operating conditions (high temperature and high rotating shaft speeds), due to poor thermal management. In particular, thermoelastic distortion of the thrust runner due to heat transfer within the bearing system results in deformations larger than the gas film thickness, which causes system failure. Thrust foil gas bearings have lower load capacity at extreme operation conditions because of difficulty in thermal management.

U.S. Pat. No. 8,189,291 relates to a fluid dynamic bearing (FDB) system for use within a hard-disk drive. A fluid dynamic bearing system may comprise an upper conical bearing and a lower conical bearing that are both disposed along a stationary shaft on which a magnetic-recording disk is rotatably mounted. The upper conical bearing and the lower conical bearing may have different cone angles, diameters, and/or lubricants to produce a desired difference in stiffness between the first conical bearing and the second conical bearing. By adjusting characteristics of the fluid dynamic bearing system to achieve the desired bearing stiffness ratio, the tendency for the magnetic-recording disks to experience a sustained vibration when the hard-disk drive receives a mechanical shock is reduced. By preventing the magnetic-recording disks from sustained vibration after a mechanical shock, data may be written to and read from the magnetic-recording disks with greater reliability.

U.S. Pat. No. 8,181,462 relates to a single-shaft exhaust gas-driven turbocharger that includes two parallel-flow first-stage centrifugal compressors in series with a single second-stage centrifugal compressor, and a one-stage turbine arranged to drive both the first- and second-stage centrifugal compressors via a single shaft on which the compressors and turbine are fixedly mounted. The compressor housing defines from one to a plurality of circumferentially spaced inlet ducts for the second wheel of the first stage, and from one to a plurality of circumferentially spaced interstage ducts leading from a vaneless diffuser of the first stage into the inlet of the second stage. In accordance with one embodiment, a first bearing assembly rotatably supports the shaft at a location between the turbine and the second-stage centrifugal compressor, and a second bearing assembly rotatably supports the shaft at a location between the first-stage centrifugal compressors and the second-stage centrifugal compressor. Advantageously, the first bearing assembly includes ball bearings and can comprise, for example, two axially spaced ball bearings. The second bearing assembly advantageously comprises a foil air bearing.

U.S. Pat. No. 7,988,426 relates to a compressor ported shroud that takes compressed air from the shroud of the compressor before it is completely compressed and delivers it to foil bearings. The compressed air has a lower pressure and temperature than compressed outlet air. The lower temperature of the air means that less air needs to be bled off from the compressor to cool the foil bearings. This increases the overall system efficiency due to the reduced mass flow requirements of the lower temperature air. By taking the air at a lower pressure, less work is lost compressing the bearing cooling air.

U.S. Pat. No. 7,553,086 relates to a journal foil bearing comprising a retaining member having an inner surface which defines a shaft opening within which a rotatable shaft is receivable for rotation; and a foil assembly affixed to and lining the inner surface and comprising a plurality of foil sub-assemblies each subtending a circumferential segment, of the inner surface. Each of the foil sub-assemblies may comprise an under foil sandwiched between a spring foil disposed radially outwardly of the under foil, and a top foil disposed radially inwardly of the under foil, the under foil, the top foil, and the spring foil each having a leading edge distal from a trailing edge in a direction of rotation of the rotatable shaft, and each of the under foil, the top foil, and the spring foil being affixed to the retaining member along their respective leading edge, their respective trailing edge, or both their respective leading edge and their respective trailing edge, wherein a radius of curvature of the top foil is less than a radius of curvature of the under foil. A method of supporting a rotating shaft is also disclosed.

U.S. Pat. No. 7,108,488 relates to a turbocharger that includes a foil bearing assembly mounted in a center housing between a compressor and a turbine of the turbocharger. The bearing assembly forms a unit installable into the center housing from one end thereof, and the center housing is a one-piece construction. The bearing assembly includes a foil thrust bearing assembly disposed between two foil journal bearings. The journals foils are mounted in annular bearing carriers fixedly mounted in the center housing. A radially inner portion of a thrust disk of the thrust bearing assembly is captured between a shaft and a shaft sleeve of the turbocharger. The center housing defines cooling air passages for supplying cooling air to the foil bearings, and optionally includes a water jacket for circulating engine coolant through the center housing.

U.S. Pat. No. 5,498,083 relates to a method and apparatus for increasing the load capacity and damping capability of a three pad compliant foil gas bearing by establishing a gas pressure force between each pad and a shaft supported by a sleeve containing the bearings.

SUMMARY OF THE INVENTION

The present invention provides a hydrodynamic gas foil bearing assembly having conical rotor surfaces and foil bearing pads. One advantage of a hydrodynamic gas foil bearing is that it provides increased bearing damping compared to a rigid surface gas bearing of the same size. The increased damping is coulomb-type damping which arises due to material hysteresis and dry-friction between the bump strips and the top foil, as well as between the bump strips and the bearing inner surface. The conical gas foil bearing assembly is suitable for use as a turbocharger bearing assembly and may also be used in other turbomachinery applications such as small aircraft engines.

Two conical rotor elements are placed end to end on the shaft to be supported. The conical rotor elements have the shape of a truncated right circular cone and thus have a large end corresponding to the base of the cone, and a small end corresponding to the frustrum of the truncated cone. The conical elements face in opposite directions and thus, the large ends of the cones may be placed together, or the small ends of the cone may be placed together. The conical rotor elements are supported on gas foil bearings. Because of the conical shape of the rotor elements, the bearing supporting each element, provides both radial and axial support, and thus the bearing assembly fills the role of both the journal bearing and the thrust bearing. Conical bearings also allow the removal of excessive heat easily from the air film thereby controlling the thermal expansion of the components. This feature enables better thermal management to prevent bearing seizure and thermal instability.

BRIEF DESCRIPTION OF THE DRAWINGS

Advantages of the present invention will be readily appreciated as the same becomes better understood by reference to the following detailed description when considered in connection with the accompanying drawings wherein:

FIG. 4A illustrates a bearing housing inner surface suitable for use with conical rotor elements in which the small ends of the cones are together (FIG. 3);

FIG. 4B illustrates a bearing housing inner surface suitable for use with conical rotor elements in which the large ends of the cones are together (FIG. 2);

DETAILED DESCRIPTION OF THE EMBODIMENTS

Figure 1:
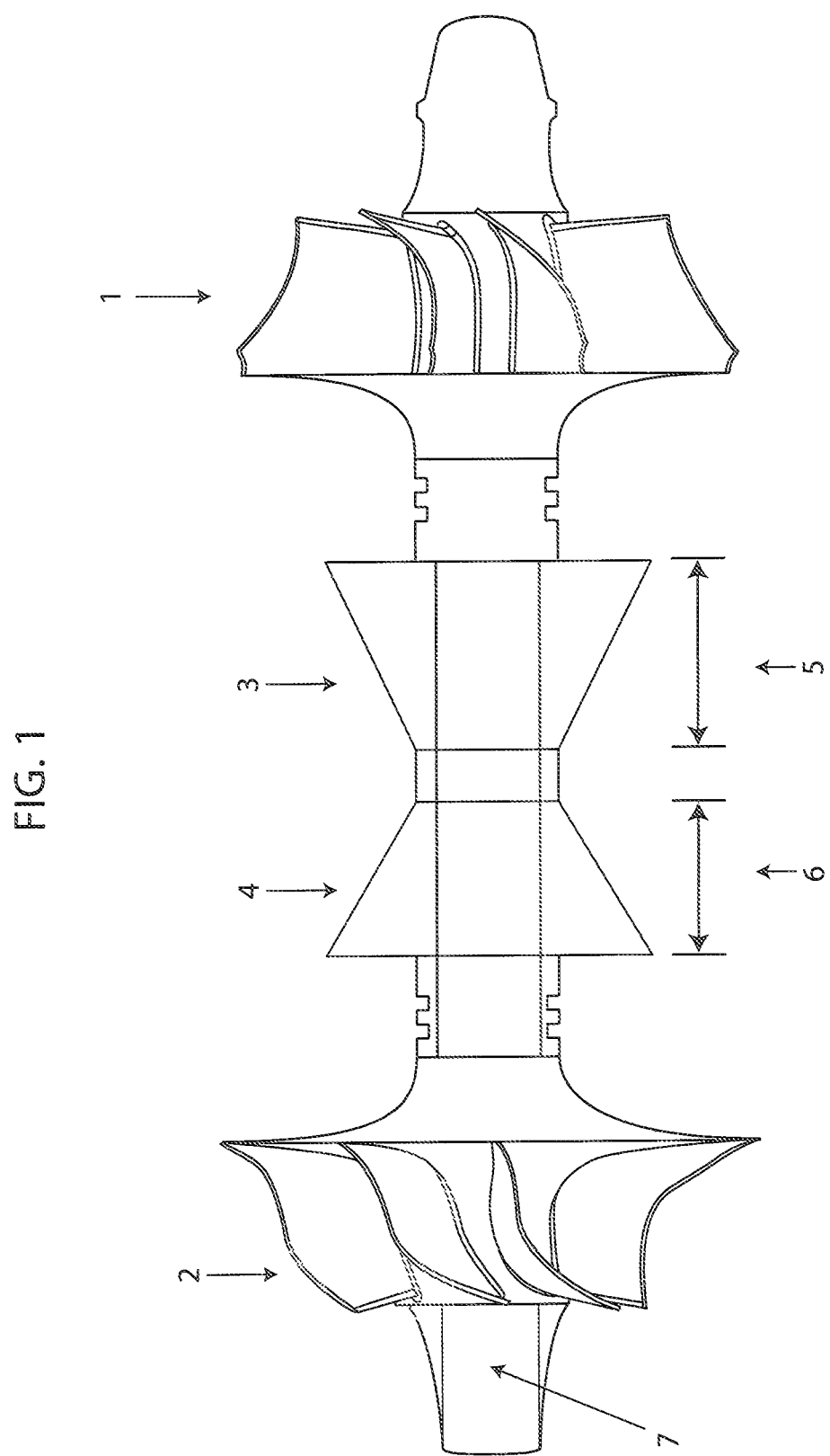
FIG. 1 illustrates a turbocharger shaft with conical rotor elements in which the small ends of the cones have been placed together.

FIG. 1 illustrates a turbocharger shaft with conical rotor elements having the shape of a truncated right circular cone in which the small ends of the cone are mounted together. A turbine wheel (1), a compressor wheel (2), a first conical rotor element (3) having a length (5), and a second conical rotor element (4) having a length (6) are mounted on the turbocharger shaft (7).

Figure 2:
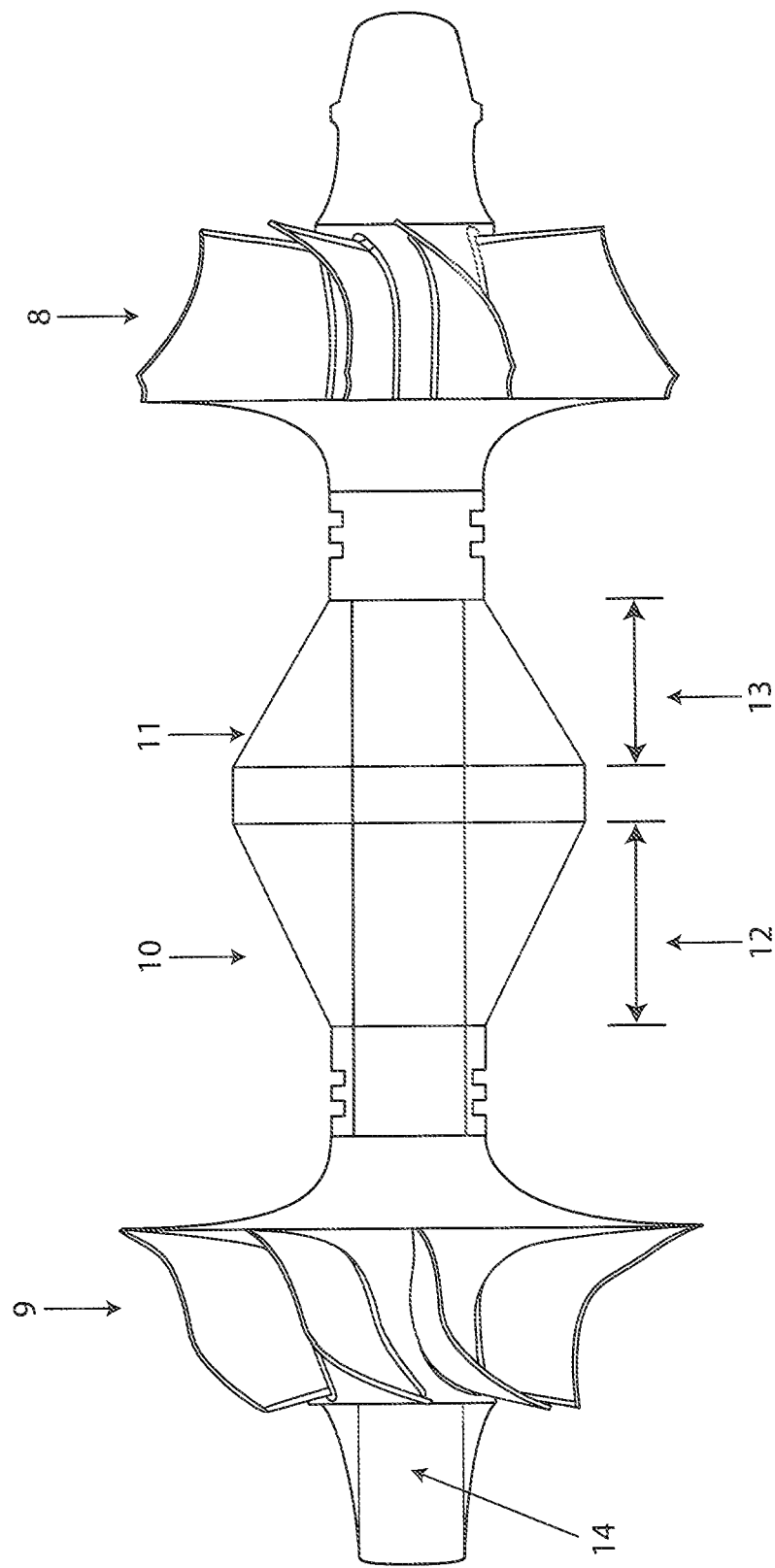
FIG. 2 illustrates a turbocharger shaft with conical rotor elements in which the large ends of the cones have been placed together.

FIG. 2 illustrates a turbocharger shaft with conical rotor elements in which the large ends of the cone are mounted together. A turbine wheel (8), a compressor wheel (9), a first conical rotor element (10) having a length (12), and a second conical rotor element (11) having a length (13) are mounted on the turbocharger shaft (14).

Figure 3:
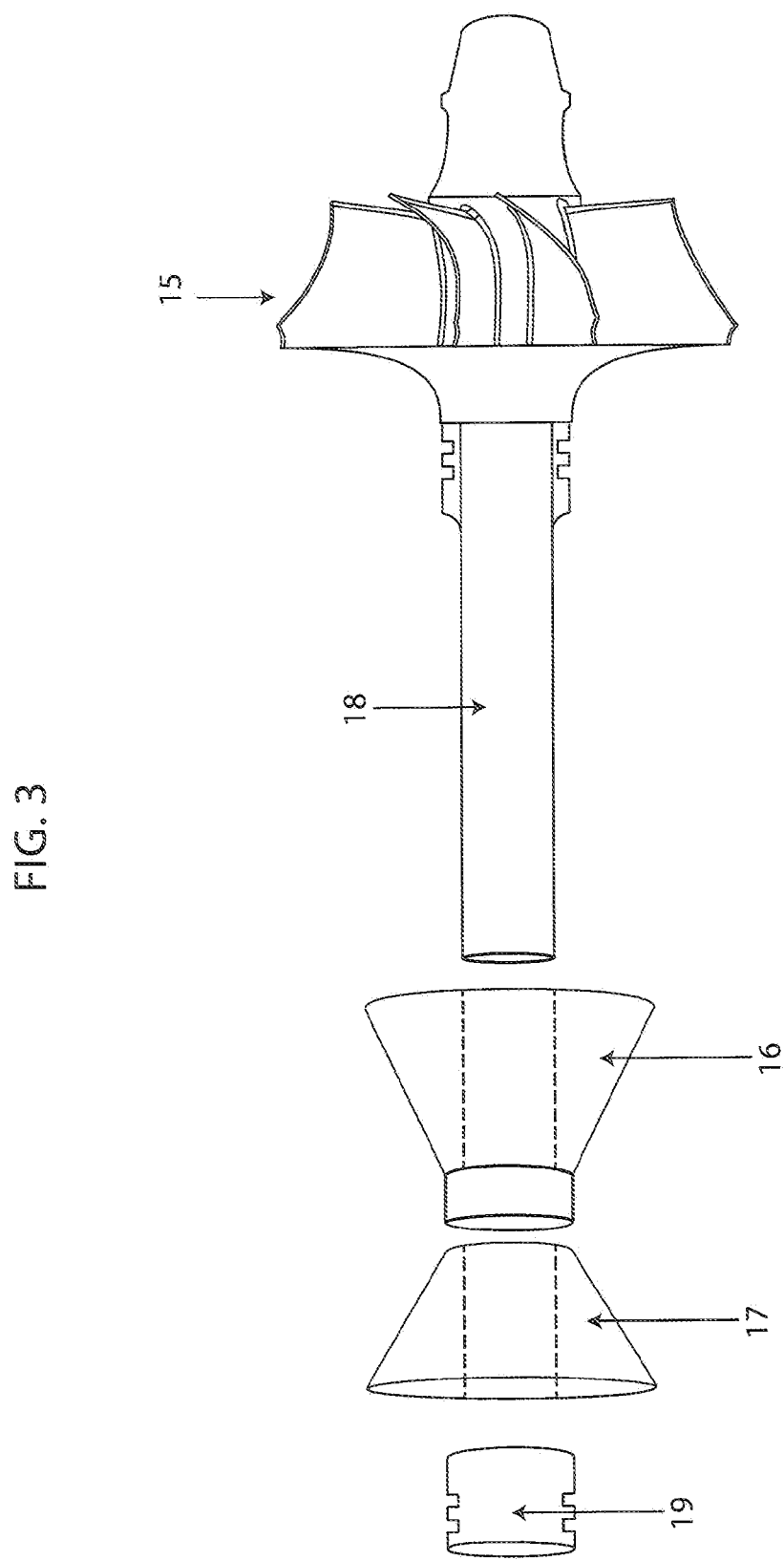
FIG. 3 illustrates the components which make up the conical rotor element.

FIG. 3 illustrates the components which make up the conical rotor assembly. The turbocharger shaft (18) has a turbine wheel (15) mounted at one end. The first conical rotor element (16) and the second conical rotor element (17) may be pressed onto the shaft (18). When they are pressed onto the shaft (18), they may be secured on the shaft by a flinger sleeve (19).

FIG. 4A illustrates a bearing housing inner surface (20) suitable for use with conical rotor elements in which the small ends of the cones are together (FIG. 3).

FIG. 4B illustrates a bearing housing inner surface (20) suitable for use with conical rotor elements in which the large ends of the cones are together (FIG. 2).

Figure 5:
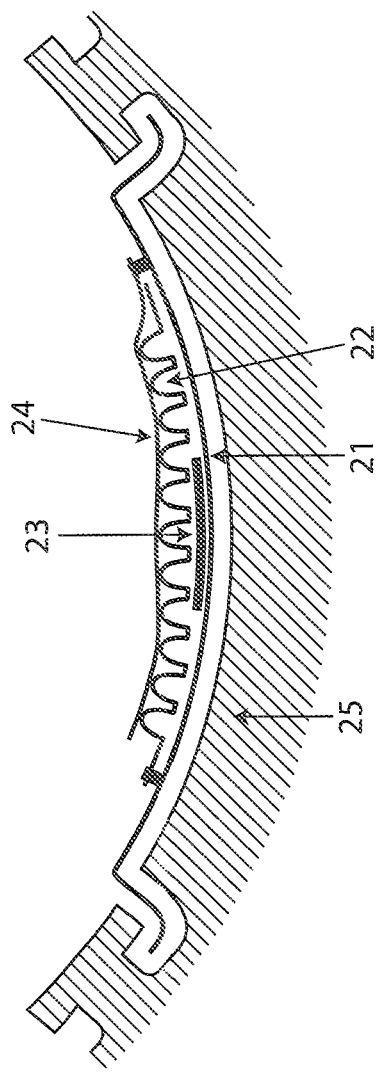
FIG. 5 illustrates one pad in a bump-type foil bearing.

FIG. 5 illustrates one pad in a bump-type foil bearing. The foil bearing is on top of the bearing housing (25). The bottom layer of the foil bearing is the base foil (21). There is a shim foil (23) on top of the base foil (21), and a bump-type foil (22) on top of the shim foil (23). The top surface of the foil bearing is a top foil (24).

Figure 6:
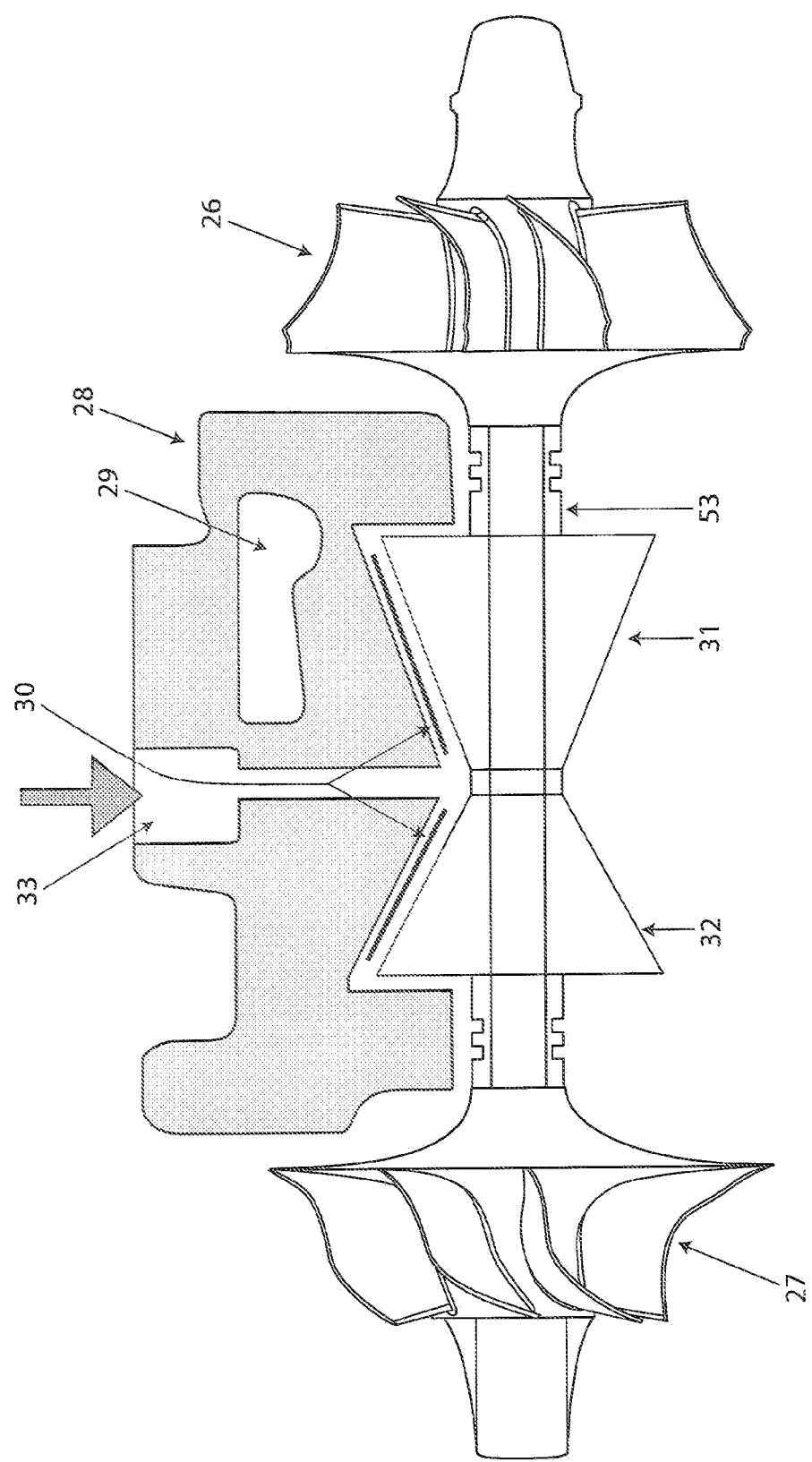
FIG. 6 illustrates a turbocharger shaft with conical rotor elements in which the small ends of the cones have been placed together in a bearing housing having water air channels for cooling.

FIG. 6 illustrates a turbocharger shaft (53) with conical rotor elements in which the small ends of the cones have been placed together in a bearing housing having water channels for cooling. The turbocharger shaft has a turbine wheel (26) and a compressor wheel (27). The turbocharger shaft has a first conical rotor element (31) and a second conical rotor element (32). The turbocharger shaft (53) is supported by hydrodynamic gas foil bearing (30). The bearing assembly housing (28) has channels (29) for cooling water. There is an inlet (33) for cooling air. Only half of the bearing assembly housing (28) is illustrated.

Figure 7:
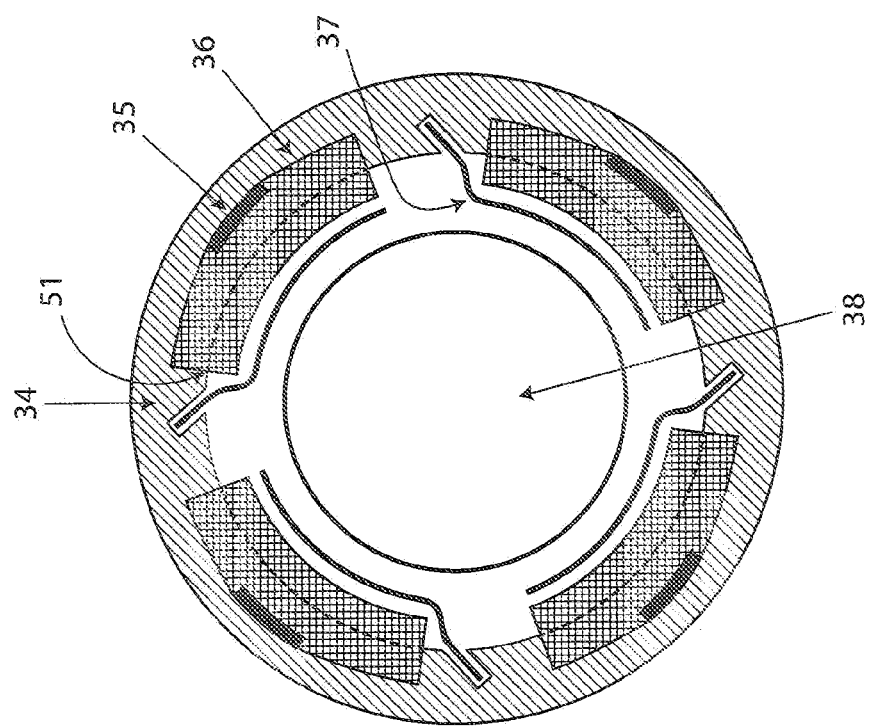
FIG. 7 illustrates a shaft supported by a foil bearing backed by metal mesh dampers.

FIG. 7 illustrates a shaft (38) supported by a foil bearing backed by metal mesh dampers (36). Each metal mesh damper (36) fits into a pocket in the bearing housing (34). The edges of the pockets are shown by the dashed lines (51). The shaft (38) is supported by the foil bearing (37). Shim foils (35) are placed behind the metal mesh dampers (36).

Figure 8:
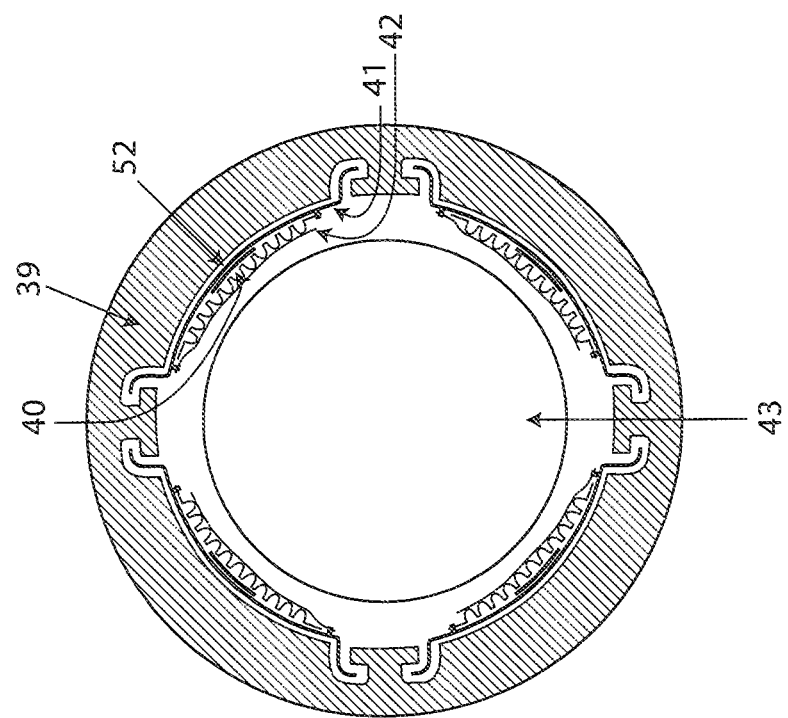
FIG. 8 illustrates a shaft supported by a foil bearing backed by bump-type foils.

FIG. 8 illustrates a shaft (43) in a bearing housing (39) supported by a four-pad bump-type foil bearing. Each pad has a base foil (41), a bump-type foil (40) and a top foil (42). Shim foil (52) is placed behind the bump-type foil (40).

Figure 9:
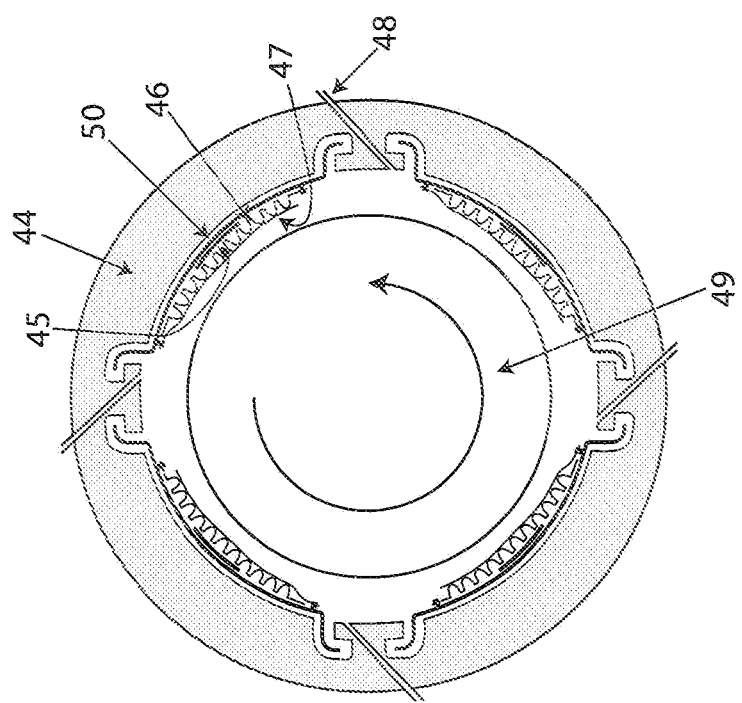
FIG. 9 illustrates a shaft supported by a foil bearing backed by bump-type foils in which four air inlets admit air to the bearing.

FIG. 9 illustrates a shaft (49) in a bearing housing (44) supported by a bearing four-pad bump-type foil bearing. Each pad has a base foil (46), a bump-type foil (45), and a top foil (47). Shim foil (50) is placed behind the bump-type foil (45). Air inlets (48) allow air to enter the bearing housing.

The foil air bearing assembly of the present invention has conical rotor elements which are pressed onto the turbocharger shaft and two to six bearings which support the shaft. When the two conical rotor elements are press-fit onto the rotatable shaft to be supported, the ends of the cone are in contact. In cases in which there is thrust load, the conical rotor elements can be different sizes. The axial length of a conical rotor element depends on the static load on the bearings caused by different wheel weights and the thrust load. Although the two conical rotor elements need not be of the same size, the ends in contact are of the same size. In a preferred embodiment of the invention, the conical rotor elements are placed together on the rotatable shaft to be supported with the small ends of the cone making end-to-end contact because this can accommodate larger rotor conical motion and/or misalignment. When the conical rotor elements are supported by bearings, the conical shape of the bearing provides both axial and lateral support to the shaft. Thrust load can be handled by having rotor elements of different sizes. Due to large static load on the turbine wheel end bearing, the first conical rotor length can be longer than that for the second conical rotor element. Rotodynamic performance and axial thrust force by aerodynamic components also determine the length of the conical rotor elements. This is illustrated in FIG. 1 where there is a thrust load from turbine wheel (1) to compressor wheel (2). Accordingly, the first rotor element (3) has a greater length (5) and the compressor wheel (2) has a shorter length (6).

In another embodiment of the invention, the larger ends of the conical rotor elements are together and are press-fit onto rotatable shaft to be supported. In this arrangement, when the conical rotor elements are supported by bearings, the conical shape of the bearing provides both axial and lateral support to the shaft. Again, thrust load may be supported by having rotor elements of different sizes. This is illustrated in FIG. 2, which illustrates a turbocharger shaft with conical bearing elements in which the large ends of the cone are mounted together. Specifically, there is a first conical rotor element (10) having a length (12) and a second conical rotor element (11) having a length (13).

As set forth above, the conical rotor is assembled from two conical rotor elements. This is illustrated in FIG. 3 in which the conical rotor elements (16) and (17) are illustrated before they are placed end to end on turbocharger shaft (18).

As noted above, the bearing housing of a turbocharger can be a hot environment. In order to assure proper bearing clearance, the bearings and the bearing housing may be cooled. The conical rotor elements should be prepared from a material having a low coefficient of thermal expansion. Such materials include Invar® 36, Kovar®, Incoloy® 903, Incoloy® 907, Incoloy® 909, and Ti-6A1.

The conical rotor elements are within a bearing housing where the inner surface has the shape of the conical rotor elements. This is illustrated in FIGS. 4A and 4B. FIG. 4A illustrates a bearing housing inner surface (20) suitable for use with rotor elements in which the small ends of the cones are together (FIG. 3). FIG. 4B illustrates a bearing housing inner surface (20) suitable for use with rotor elements in which the large ends of the cones are together (FIG. 2).

Inside the bearing housing there are two to six hydrodynamic gas foil bearings. The components of one pad of a bump-type foil bearing are illustrated in FIG. 5. In one embodiment, the bottom layer of the foil bearing is the base foil (21). There is a compliant component on top of the base foil (21). In FIG. 5 this compliant component is a bump-type foil (22). Other compliant components may be used such as a metal mesh damper or a hemispherical convex foil. The compliant structures (bump-type foil, metal mesh damper, and hemisphere convex foil) may have three to five identical segments split axially to increase load capacity and accommodate misalignment/large conical shaft motion. Optionally, shim foil (23) may be placed on top of the base foil (21). The shim foil sets the clearance between the bearing and the shaft and increases bearing stiffness and damping coefficients. The increased stiffness and greater damping of the bearing extend the stable operating speed range and increase system stability.

The conical rotor elements of the shaft to be supported will have some contact with top foil inner surface during start up and shut down. Optionally, an engineered solid lubricant coating may be provided to cut down on wear at rotor startup and shutdown when the shaft outer surface comes in contact with the top foil inner surface. Both the conical rotor elements on the shaft, at the bearing location, and the top foil surface may be coated with solid lubricants. Such a coating lessens frictional losses and the ensuing small drag torque when the rotor starts and stops until the shaft rotates fast enough to build up a sufficient hydrodynamic gas film to support the shaft. Various lubricants can be coated on top foil inner surface, including but not limited to polyimide, graphite, polytetraflouroethylene (PTFE), and molybdenum disulfide (MoS2). The conical rotor elements on the shaft may also be coated lubricants such as polyimide, graphite, polytetraflouroethylene (PTFE), and molybdenum disulfide (MoS2). In addition, the conical rotor elements on the shaft may be coated with a thin dense nickel containing composite coating such as PS304 or PS400. A second solid lubricant, such as but not limited to polyimide, graphite, polytetraflouroethylene (PTFE), and molybdenum disulfide (MoS2), may be overcoated on the PS304, or PS400 coating.

The foil bearing assembly may be assembled in several ways. The foil bearing components may be assembled into a bearing cartridge, which may then be attached to the bearing housing. Both ends of the base foil may be inserted in the slots on the bearing housing inner surface. Alternatively, the base foil (21) may be spot welded to the bearing housing at both ends. If the compliant element is a bump-type foil (22) or a hemisphere convex foil, it may be spot welded to the base foil. The shim foil (23) and the top foil (24) may be spot welded to the base foil. If the compliant element is a metal mesh damper (36), it may be placed in pockets machined on the bearing housing.

In one method of assembling the bearing, the base foil is cut to the correct size. The shim foil is spot welded to the base foil. The bump-type foil is spot welded to the base foil. The top foil is spot welded to the base foil on the opposite end of the base foil from which the bump-type foil was spot welded.

The bearing housing may have channels through which cooling water may be circulated. In addition, compressed forced air may be injected into the bearing to provide cooling. The bearing housing may have 1 to 5 air injection ports for each conical rotor element. The air may be injected at an angle against the rotor rotation. Such injection against the rotor rotation slows the speed of the air within the bearing housing and extends the stable operating speed range of the bearing.

The hydrodynamic gas foil bearing assembly having conical rotor elements is not limited to use in turbochargers. They could be used in turbine turbo-alternators, small aircraft turbofan engines and the like.

While the invention has been shown and described with respect to the particular embodiments, it will be understood by those skilled in the art that various changes and modifications may be made without departing from the scope of the present invention as defined in the following claims.

What is claimed:

1. A hydrodynamic foil gas bearing assembly (21, 22, 23, 24, 30, 35, 36, 37, 40, 41, 42, 45, 46, 47, 50, 52) suitable for supporting a rotatable shaft (7, 14, 18, 43, 49, 53) therein, wherein the hydrodynamic foil gas bearing assembly (21, 22, 23, 24, 30, 35, 36, 37, 40, 41, 42, 45, 46, 47, 50, 52) comprises:
   a. two conical rotor elements (3, 4, 10, 11, 16, 17, 31, 32), each having a small circular end and a large circular end; and
   b. at least two foil bearings (21, 22, 23, 24, 30, 35, 36, 37, 40, 41, 42, 45, 46, 47, 50, 52) having at least one compliant component (22, 36, 45) and at least one top foil (24, 42, 47) positioned atop the at least one compliant component (22, 36, 45), in which the conical rotor elements (3, 4, 10, 11, 16, 17, 31, 32) make end-to-end contact when placed upon the rotatable shaft (7, 14, 18, 43, 49, 53) disposed within the hydrodynamic foil gas bearing assembly (21, 22, 23, 24, 30, 35, 36, 37, 40, 41, 42, 45, 46, 47, 50, 52) and in which the ends of the conical rotor elements (3, 4, 10, 11, 16, 17, 31, 32) which are in contact are of the same size.

2. The bearing assembly (21, 22, 23, 24, 30, 35, 36, 37, 40, 41, 42, 45, 46, 47, 50, 52) according to claim 1 in which the compliant component (22, 36, 45) is selected from a group consisting of bump foil (22, 40, 45), metal mesh damper (36), and hemisphere convex foil.

3. The bearing assembly according to claim 1 in which the conical rotor elements (3, 4, 10, 11, 16, 17, 31, 32) are of unequal size.

4. The bearing assembly according to claim 3 in which the small ends of the conical rotor elements (3, 4, 16, 17) are placed together.

5. The bearing assembly according to claim 3 in which the large ends of the conical rotor elements (10, 11) are placed together.

6. The bearing assembly according to claim 3 further comprising a shim foil (23, 35, 50, 52).

7. The bearing assembly according to claim 1 in which the small ends of the conical rotor elements (3, 4, 16, 17) are placed together.

8. The bearing assembly according to claim 1 in which the large ends of the conical rotor elements (10, 11) are placed together.

9. The bearing assembly according to claim 1 further comprising a bearing housing (20).

10. The bearing assembly according to claim 9 in which the small ends of the conical rotor elements (3, 4, 16, 17) are placed together.

11. The bearing assembly according to claim 9 in which the large ends of the conical rotor elements (10, 11) are placed together.

12. The bearing assembly according to claim 8 in which the bearing housing has at least one air inlet port (33) for each conical rotor element (3, 4, 10, 11, 16, 17, 31, 32).

13. The bearing assembly according to claim 1 in which the top foil is coated with a solid lubricant selected from the group consisting of polyimide, graphite, polytetraflouroethylene, and molybdenum disulfide.

14. The bearing assembly according to claim 1 further comprising a shim foil (23, 35, 50, 52).

15. The bearing assembly according to claim 1 in which the conical rotor elements (3, 4, 10, 11, 16, 17, 31, 32) are coated with a lubricant selected from the group consisting of polyimide, graphite, polytetraflouroethylene (PTFE), molybdenum disulfide (MoS2), PS304 and PS400.

* * * * *